United States Patent [19]

Schmid et al.

[11] 4,258,023
[45] Mar. 24, 1981

[54] PROCESS FOR THE PYROGENOUS PRODUCTION OF VERY FINELY DIVIDED OXIDES OF A METAL AND/OR OF A METALLOID

[75] Inventors: Josef Schmid, Rheinfelden; Ludwig Lange, Bruehl; Hans Klebe; Dieter Schutte, both of Rheinfelden, all of Fed. Rep. of Germany

[73] Assignee: Deutsche Gold-und Silber-Scheideanstalt Vormals Roessler, Frankfurt am Main, Fed. Rep. of Germany

[21] Appl. No.: 85,358

[22] Filed: Oct. 16, 1979

[30] Foreign Application Priority Data

Nov. 17, 1978 [DE] Fed. Rep. of Germany ....... 2849851

[51] Int. Cl.$^3$ .................. C01B 33/113; C01F 7/02; C01G 23/047; C01G 17/02
[52] U.S. Cl. .................................. 423/336; 423/337; 423/592; 423/624; 423/625; 423/612; 423/613; 423/487
[58] Field of Search ........ 423/592, 336, 337, 611-613, 423/624, 625, 487

[56] References Cited

U.S. PATENT DOCUMENTS

| 3,201,337 | 8/1965 | Eichelberger et al. |
| 3,361,525 | 1/1968 | De Rycke et al. ................. 423/337 |
| 3,695,840 | 10/1972 | Pfender .............................. 423/592 |
| 3,954,945 | 5/1976 | Lange et al. ........................ 423/337 |

FOREIGN PATENT DOCUMENTS

| 768059 | 9/1967 | Canada ................................... 423/592 |
| 1066651 | 4/1967 | United Kingdom .................... 423/592 |
| 1121279 | 7/1968 | United Kingdom .................... 423/337 |
| 1513890 | 6/1978 | United Kingdom .................... 423/592 |

Primary Examiner—Herbert T. Carter

[57] ABSTRACT

In case of the pyrogenous production of metal oxides or metalloid oxides, whenever a halogen compound is used as a starting material, an elementary halogen is formed as a byproduct. This may be converted in the cooling section of the reaction apparatus with hydrogen into hydrogen halide.

For a better temperature control and prevention of uncontrolled deflagration of the hydrogen in case of the halogen detonating gas reaction, according to the invention the hydrogen is introduced into the cooling section by means of a double jacket pipe, whereby an inert gas is introduced additionally by way of the interstice between the inside wall and the outside jacket of the double jacket pipe into the cooling section.

4 Claims, 3 Drawing Figures

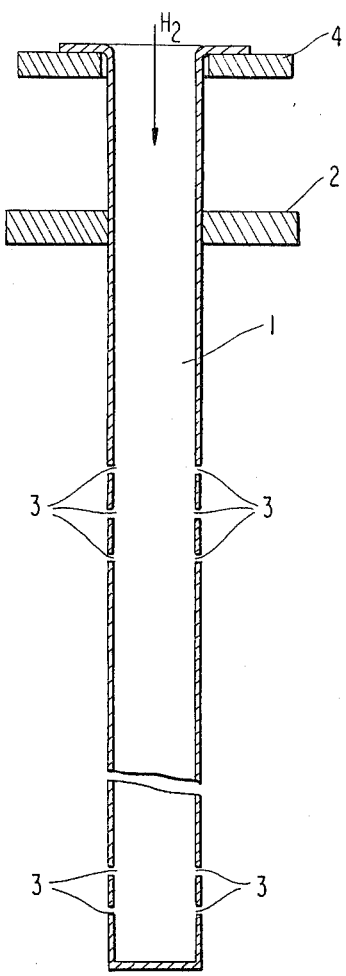
FIG I
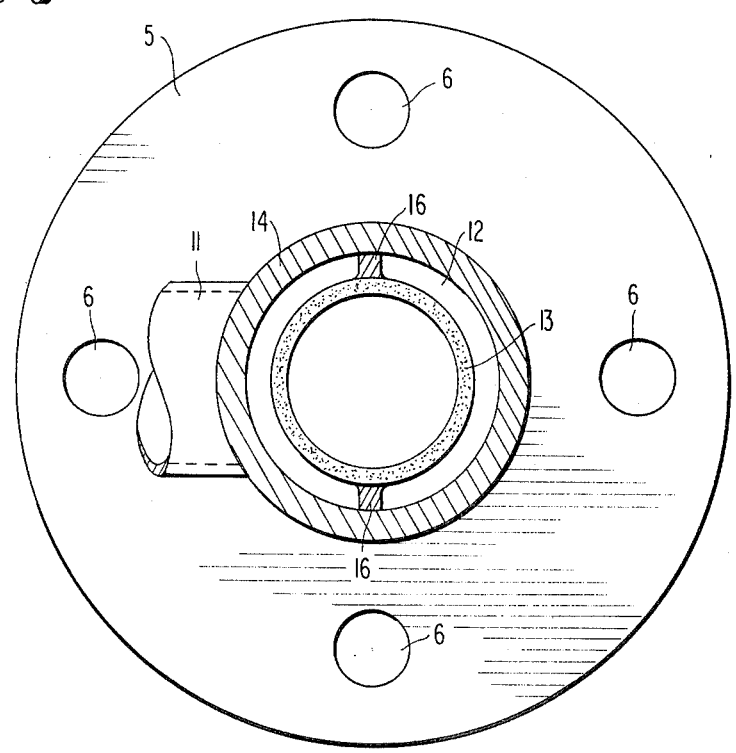
FIG 3

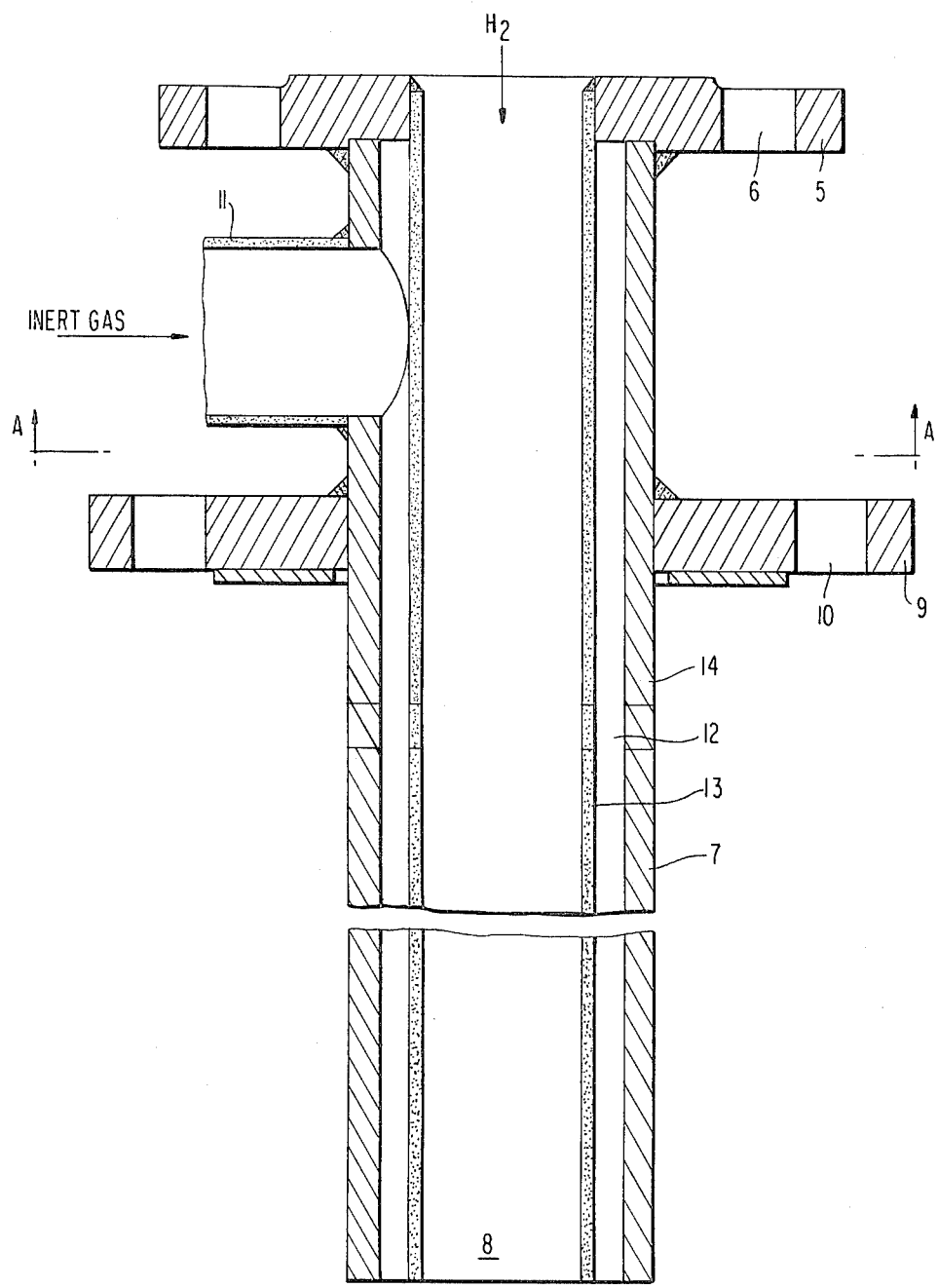

PROCESS FOR THE PYROGENOUS PRODUCTION OF VERY FINELY DIVIDED OXIDES OF A METAL AND/OR OF A METALLOID

INTRODUCTION

The invention relates to a process for the pyrogenous production of very finely dispersed oxides of a metal and/or metalloid is used as the starting material and wherein the elementary halogen, formed during the formation of the oxide of the metal and/or metalloid as a byproduct, is converted during the cooling-off of the reaction products with additionally introduced gaseous hydrogen below the reaction temperature of the detonating gas mixture, consisting of the additionally introduced gaseous hydrogen and the oxygen contained in the reaction gases, into hydrogen halide.

BACKGROUND OF THE INVENTION

In carrying out the pyrogenous production of very finely dispersed oxides of a metal and/or a metalloid, volatile or evaporable compounds of the metal and/or the metalloid are fed together with a combustible or steam-forming gas and oxygen or oxygen containing gases either separately or in a mixture to a burner. At the same time the combustible and the oxygen containing gas are fed-in, in such a quantitative ratio, which guarantees both a complete combustion of the combustible gas as well as the hydrolysis of the evaporable compound of the metal and/or the metalloid.

Whenever inorganic or organic halogen compounds of the metal and/or of the metalloid are used, then the metaloxide and/or metalloid oxide are obtained together with a waste gas, containing halogen halide, which is separated in proper separating apparatus from the metal and/or metalloid oxide. Elementary halogen is formed in a secondary reaction. Depending on the conduction of the reaction conditions for the formation of the metal oxide and/or metalloid oxide, 6 to 10% by weight of elementary halogen develops, based on the quantity of halogen halide formed.

It has heretofore been known, in a pyrogenous process for the production of oxides of a metal and/or metalloid, to remove the developed elementary halogen, for example, chlorine, from the waste gas of the reaction, by reducing the formed elementary halogen with hydrogen during the cooling off of the reaction product below the reaction temperature of the hydrogen, with the oxygen contained in the waste gas of the reaction (German OS No. 25 33 925).

In this prior known process, wherein $SiCl_4$ (silicon tetrachloride) is used as the starting material for the production of silicon dioxide, the mixture developed from reaction waste gas and silicon dioxide, passes within a relatively long cooling section through a temperature drop of 1000° to 200° C. during cooling off. The additional hydrogen is introduced into an area of the cooling section in which the reaction waste gases still have a temperature of 500° to 700° C. An addition of the hydrogen at a temperature above 700° C. is not to be recommended, because a reaction of the hydrogen with the oxygen will occur at higher temperatures. The addition of the hydrogen at a temperature of below 500° C. is likewise not to be recommended since there the reaction rate of the reaction speed of the hydrogen with the elementary chlorine is too slow.

The best results may be obtained, whenever the elementary hydrogen is introduced at a temperature between 550° and 630° C.

The precise point of introduction for the elementary hydrogen in the cooling section depends on the load, i.e., in case of changes—depending on production—of the flow velocity, the point of introduction for the elementary hydrogen is the cooling section must be shifted.

A pipe is used for the introduction of the hydrogen, which, in its length, corresponds to the diameter of the cooling section. This pipe, in its jacket, has two rows of bores through which the hydrogen is introduced. A cross-sectional drawing of such an introducing pipe is shown in FIG. 1.

However, the known process has the disadvantage that even in case of a small load changes the point of introduction for the hydrogen must be changed. It is a further disadvantage, that under certain circumstances the hydrogen reacts very violently with the elementary chlorine with formation of flames. Thus the reaction becomes uncontrollable and under certain circumstances it may lead to an impairment of the silicon dioxide contained in the reaction waste gas. A premature wear of the introducing pipes for the hydrogen is connected with that.

SUMMARY OF THE INVENTION

The object of the invention is a process for the pyrogenous production of very finely dispersed oxides of a metal and/or a metalloid, wherein an evaporable halogen compound of the metal and/or the metalloid is used as a starting material and wherein the elementary halogen formed during the formation of the oxide of the metal and/or the metalloid, is converted into hydrogen halide during the cooling off of the reaction products with additionally introduced gaseous hydrogen below the reaction temperature of the detonating gas mixture, consisting of the additionally introduced gaseous hydrogen and the oxygen contained in the reaction waste gases, which is characterized in that the gaseous hydrogen is introduced into the cooling section by means of at least one double jacketed pipe, whereby additionally an inert gas is introduced by means of the same double jacketed pipe, which is guided between the outer and the inner jacket of said double jacketed pipe.

The quantity of additional hydrogen is guided by the reaction conditions for the specific metal oxide or metalloid oxide to be produced. At the same time so much hydrogen may be added that in the waste gas obtained finally, a quantity of hydrogen of 1.6 to 2.0 volume % is measured.

The addition of hydrogen may be accomplished over the entire cooling distance at several, for example, 3 to 6 points, whereby a double jacketed pipe is used at every point.

In a preferred embodiment of the invention the elementary hydrogen is introduced into the cooling section at a temperature of 500° to 700° C., especially between 550° and 630° C.

A noble gas or ribbon carbon dioxide, especially nitrogen may be used as an inert gas. It may be used in a quantity of 20 to 200 m³/h, preferably at 50 to 150 m³/h.

As a starting material for the production of the metal oxides or metalloid oxides, evaporable halogen compounds of the metals aluminum or titanium or else of the metalloids (semi metals) silicon or germanium may be used.

For the production of mixed oxides of different elements, a mixture of evaporable halogen compounds of the corresponding elements may be used as starting material.

In a preferred embodiment, the corresponding chloride of the metals or metalloids may be used as halogen compound for a starting material. But organic halogen compounds may also be used. Thus, use of $SiHCl_3$, $SiCl_2H_2$, $SiCl_4$, $CH_3SiCl_3$, $(CH_3)_2SiCl_2$ $(CH_3)_3SiCl$, $CH_3—CH_2—SiCl_3$ or $(CH_3—CH_2) SiCl_2$ is also possible for the production of silicon dioxide.

The process of the invention has the advantages that the hydrogen can be mixed more intensively with the reaction waste gas. As a result of the simultaneous addition of the inert gas, it is possible to influence the temperature at the point of introduction, so that in case of changes of flow a shifting of the point of introduction may be avoided. Thus the introduction of the oxygen may take place at a point, where the temperature of the reaction waste gases is so high that an immediate deflagration of the hydrogen with the halogen would take place, without this undesirable deflagration taking place. It is furthermore advantageous that by the introduction of the inert gas the introducing pipe for the hydrogen is cooled and thus is durable longer, and the corrosion may be reduced. Moreover, the deposit of metaloxide or metalloid oxide on the introducing pipe will be prevented by the introduction of inert gas.

The process of the invention will be explained and described in more detail on the basis of the drawing.

FIG. 1 shows a pipe for the introduction of hydrogen according to the status of the prior art.

FIG. 2 shows a double-jacketed pipe for the introduction of hydrogen according to the invention in longitudinal cut, and FIG. 3 shows the double-jacketed pipe for the introduction of hydrogen according to FIG. 2 in cross-section A—A.

DETAILED DESCRIPTION OF THE INVENTION

According to FIG. 1, the pipe 1 for introducing hydrogen is attached in the wall of the cooling section 2 such, that its length corresponds to the diameter of the cooling section. The pipe 1 for introducing hydrogen has two rows of bores 3 in the wall. The hydrogen is inserted into the introducing pipe 1 by way of a line, which is attached to the flange 4, and it flows through the bore 3 into the cooling section.

According to FIG. 2, the hydrogen is guided via a line, which is attached to the flange 5 which has the bore 6, into the double jacketed pipe 7, and emerges at the open end 8 of the double jacketed pipe 7 within the cooling section. The double jacketed pipe 7 is attached to the wall of the cooling section by means of the flange 9, which has the bores 10. The inert gas is guided through the supply line 11 into the interstice 12 between the inside wall 13 and the outside wall 14 of the double jacketed pipe 7. The inert gas flows through the open end 13 of the interstice 12 into the inside of the cooling section.

FIG. 3 shows the cross section A—A of the double jacketed pipe according to FIG. 2. The inside wall 13 and the outside wall 14 of the double jacketed pipe are interconnected by the bridges 16.

What is claimed is:

1. In a process for the pyrogenic production of a finely dispersed oxide of a metal or a metalloid in a reaction apparatus wherein an evaporable halogen compound of the metal or metal oxide is used as the starting material and wherein elementary halogen is formed as a by-product during the conversion of said evaporable halogen compound to said oxide, and further wherein said halogen by product is converted into hydrogen halide during the cooling down of the reaction products by feeding gaseous hydrogen into the cooling section of said apparatus by means of a pipe entering into the cooling section of said apparatus, the improvement comprising introducing the gaseous hydrogen into the cooling section of the apparatus by means of the inner pipe of at least one double-jacket pipe, which is inserted into the cooling section whereby simultaneously an inert gas is introduced into said cooling section by means of the same double-jacket pipe, which inert gas is guided between the outside and the inside jacket of the double jacket pipe.

2. The process of claim 2 wherein the evaporable halogen compound is a compound of aluminum, titanium, silicon or germanium.

3. The process of claim 2 wherein the hydrogen and inert gas are introduced into said reaction apparatus in the cooling section thereof where the temperature ranges from 500° C. to 700° C.

4. The process of claim 2 wherein the length of the double jacket pipe corresponds to the diameter of the cooling section.

* * * * *